US009253440B2

(12) United States Patent
Setton

(10) Patent No.: US 9,253,440 B2
(45) Date of Patent: *Feb. 2, 2016

(54) AUGMENTING A VIDEO CONFERENCE

(71) Applicant: TangoMe, Inc., Mountain View, CA (US)

(72) Inventor: Eric Setton, Menlo Park, CA (US)

(73) Assignee: TangoMe, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/157,330

(22) Filed: Jan. 16, 2014

(65) Prior Publication Data

US 2014/0132699 A1  May 15, 2014

Related U.S. Application Data

(63) Continuation of application No. 13/025,943, filed on Feb. 11, 2011, now Pat. No. 8,665,307.

(51) Int. Cl.
*H04N 7/15* (2006.01)
*H04N 7/14* (2006.01)

(52) U.S. Cl.
CPC .............. *H04N 7/15* (2013.01); *H04N 7/147* (2013.01); *H04N 7/157* (2013.01)

(58) Field of Classification Search
CPC .......... H04N 7/147; H04N 7/15; H04N 7/157
USPC .............. 348/14.03, 14.08, 14.01, 14.07; 379/93.21; 455/466; 715/757
See application file for complete search history.

(56) References Cited

U.S. PATENT DOCUMENTS

| 6,731,323 B2 | 5/2004 | Doss et al. |
| 6,836,286 B1 | 12/2004 | Tachi et al. |
| 7,003,040 B2 | 2/2006 | Yi |
| 7,007,236 B2 | 2/2006 | Dempski et al. |
| 7,441,198 B2 * | 10/2008 | Dempski ................ G06F 3/017 348/E7.083 |
| 7,570,803 B2 | 8/2009 | Criminisi et al. |
| 7,983,497 B2 | 7/2011 | Kakii et al. |
| 8,150,155 B2 | 4/2012 | El-Maleh et al. |
| 8,284,230 B2 | 10/2012 | Jeong |
| 8,373,742 B2 | 2/2013 | Wheatley et al. |
| 8,373,799 B2 | 2/2013 | Reponen et al. |
| 8,514,263 B2 | 8/2013 | Periyannan et al. |

(Continued)

FOREIGN PATENT DOCUMENTS

| JP | 2005079882 A | 3/2005 |
| KR | 1020110042447 A | 4/2011 |

OTHER PUBLICATIONS

"PCT/US2012/051595 Extended European Search Report", Sep. 15, 2014, 9 pages.

*Primary Examiner* — Gerald Gauthier

(57) ABSTRACT

A device configured for participation in a video conference. The device includes a display disposed on the device for displaying video captured at a second device. The device also includes a virtual object receiver for receiving a virtual object, wherein the virtual object is configured to augment the video conference. A virtual object incorporator for incorporating the virtual object into the video captured at the second device, and a transmitter for transmitting said video comprising the virtual object. The video comprising the virtual object is configured to be displayed at the second device.

20 Claims, 9 Drawing Sheets

(56) References Cited

U.S. PATENT DOCUMENTS

| | | |
|---|---|---|
| 8,542,943 B2 | 9/2013 | Basso et al. |
| 8,581,953 B2 | 11/2013 | Kim |
| 8,665,307 B2 * | 3/2014 | Setton .................... H04N 7/147 345/419 |
| 2003/0193558 A1 | 10/2003 | Doss et al. |
| 2004/0056887 A1 | 3/2004 | Yi |
| 2004/0155902 A1 | 8/2004 | Dempski et al. |
| 2005/0078866 A1 | 4/2005 | Criminisi et al. |
| 2006/0088038 A1 | 4/2006 | Ravula et al. |
| 2006/0092267 A1 | 5/2006 | Dempski et al. |
| 2007/0210954 A1 | 9/2007 | Funae et al. |
| 2007/0242066 A1 | 10/2007 | Levy Rosenthal |
| 2008/0019522 A1 | 1/2008 | Proctor |
| 2008/0062169 A1 | 3/2008 | Heesemans et al. |
| 2008/0158334 A1 | 7/2008 | Reponen et al. |
| 2009/0244256 A1 | 10/2009 | Wheatley et al. |
| 2009/0303231 A1 | 12/2009 | Robinet et al. |
| 2010/0118935 A1 | 5/2010 | Kakii et al. |
| 2010/0134588 A1 | 6/2010 | Kim |
| 2011/0063404 A1 | 3/2011 | Raffle et al. |
| 2011/0208807 A1 | 8/2011 | Shaffer |
| 2011/0279639 A1 | 11/2011 | Anand et al. |
| 2012/0084661 A1 | 4/2012 | Gil et al. |
| 2012/0206558 A1 * | 8/2012 | Setton .................... H04N 7/147 348/14.03 |
| 2012/0206560 A1 * | 8/2012 | Setton .................... H04N 7/157 348/14.08 |
| 2014/0132699 A1 * | 5/2014 | Setton .................... H04N 7/147 348/14.03 |

* cited by examiner

300

```
┌─────────────────────────────────────────────────────────────────┐
│  ENABLE A VIRTUAL OBJECT TO BE ACCESSED BY A FIRST DEVICE,      │
│  WHEREIN THE FIRST DEVICE IS CONFIGURED FOR PARTICIPATING IN    │
│  THE VIDEO CONFERENCE WITH A SECOND DEVICE                      │
│                            310                                   │
└─────────────────────────────────────────────────────────────────┘
                              │
                              ▼
┌─────────────────────────────────────────────────────────────────┐
│  ENABLE THE VIRTUAL OBJECT TO BE INCORPORATED INTO A VIDEO OF   │
│  THE VIDEO CONFERENCE CAPTURED AT THE SECOND DEVICE, WHEREIN    │
│  THE VIDEO COMPRISING THE VIRTUAL OBJECT IS CONFIGURED TO BE    │
│  DISPLAYED AT THE SECOND DEVICE                                 │
│                            320                                   │
└─────────────────────────────────────────────────────────────────┘

┌─────────────────────────────────────────────────────────────────┐
│  ENABLE TRANSMISSION OF THE VIDEO COMPRISING THE VIRTUAL        │
│  OBJECT FROM THE FIRST DEVICE TO THE SECOND DEVICE              │
│                            330                                   │
└─────────────────────────────────────────────────────────────────┘

┌─────────────────────────────────────────────────────────────────┐
│  ENABLE CONCURRENT DISPLAY, AT THE FIRST DEVICE AND THE SECOND  │
│  DEVICE, OF SAID VIDEO COMPRISING SAID VIRTUAL OBJECT           │
│                            340                                   │
└─────────────────────────────────────────────────────────────────┘

┌─────────────────────────────────────────────────────────────────┐
│  ENABLE COOPERATIVE MANIPULATION OF THE INCORPORATED VIRTUAL    │
│  OBJECT AT THE FIRST DEVICE AND THE SECOND DEVICE               │
│                            350                                   │
└─────────────────────────────────────────────────────────────────┘
```

```
┌─────────────────────────────────────────────────────────────────┐
│   DISPLAY VIDEO CAPTURED AT A SECOND DEVICE ON A FIRST DEVICE   │
│                              510                                │
└─────────────────────────────────────────────────────────────────┘
                                 │
                                 ▼
┌─────────────────────────────────────────────────────────────────┐
│  RECEIVE A VIRTUAL OBJECT AT THE FIRST DEVICE, WHEREIN THE      │
│  VIRTUAL OBJECT IS CONFIGURED TO AUGMENT THE VIDEO CONFERENCE   │
│                              515                                │
└─────────────────────────────────────────────────────────────────┘
                                 │
                                 ▼
┌─────────────────────────────────────────────────────────────────┐
│   INCORPORATE THE VIRTUAL OBJECT INTO THE VIDEO CAPTURED AT THE │
│                         SECOND DEVICE                           │
│                              520                                │
│  ┌───────────────────────────────────────────────────────────┐  │
│  │ IN RESPONSE TO USER INPUT AT A TOUCH SCREEN DISPLAY,      │  │
│  │ INCORPORATE THE VIRTUAL OBJECT INTO THE VIDEO CAPTURED    │  │
│  │ AT THE SECOND DEVICE                                      │  │
│  │                         522                               │  │
│  └───────────────────────────────────────────────────────────┘  │
└─────────────────────────────────────────────────────────────────┘
                                 │
                                 ▼
┌─────────────────────────────────────────────────────────────────┐
│   ENABLE THE VIDEO COMPRISING THE VIRTUAL OBJECT TO BE          │
│              DISPLAYED AT THE SECOND DEVICE                     │
│                              530                                │
└─────────────────────────────────────────────────────────────────┘

┌─────────────────────────────────────────────────────────────────┐
│   TRANSMIT THE VIDEO COMPRISING THE VIRTUAL OBJECT TO THE       │
│                         SECOND DEVICE                           │
│                              535                                │
└─────────────────────────────────────────────────────────────────┘

┌─────────────────────────────────────────────────────────────────┐
│  MANIPULATE, AT THE SECOND DEVICE, THE VIRTUAL OBJECT           │
│  INCORPORATED INTO THE VIDEO CAPTURED AT THE SECOND DEVICE      │
│                              540                                │
└─────────────────────────────────────────────────────────────────┘

┌─────────────────────────────────────────────────────────────────┐
│  MANIPULATE, AT THE FIRST DEVICE, THE VIRTUAL OBJECT            │
│  INCORPORATED INTO THE VIDEO CAPTURED AT THE SECOND DEVICE      │
│                              545                                │
│  ┌───────────────────────────────────────────────────────────┐  │
│  │ IN RESPONSE TO USER INPUT RECEIVED AT A TOUCH SCREEN      │  │
│  │ DISPLAY OF A HAND-HELD MOBILE DEVICE, MANIPULATE THE      │  │
│  │ VIRTUAL OBJECT INCORPORATED INTO THE VIDEO CAPTURED AT    │  │
│  │ THE SECOND DEVICE                                         │  │
│  │                         547                               │  │
│  └───────────────────────────────────────────────────────────┘  │
└─────────────────────────────────────────────────────────────────┘

┌─────────────────────────────────────────────────────────────────┐
│  COOPERATIVELY MANIPULATE, AT THE FIRST DEVICE AND THE SECOND   │
│  DEVICE, THE VIRTUAL OBJECT INCORPORATED INTO THE VIDEO         │
│  CAPTURED AT THE SECOND DEVICE                                  │
│                              550                                │
└─────────────────────────────────────────────────────────────────┘

┌─────────────────────────────────────────────────────────────────┐
│  CONCURRENTLY DISPLAY, AT THE FIRST DEVICE, THE VIRTUAL OBJECT  │
│  AND THE VIDEO CAPTURED AT THE SECOND DEVICE                    │
│                              555                                │
└─────────────────────────────────────────────────────────────────┘

┌─────────────────────────────────────────────────────────────────┐
│  CONCURRENTLY DISPLAY, AT THE FIRST DEVICE, A VIDEO CAPTURED    │
│  AT THE FIRST DEVICE AND THE VIDEO CAPTURED AT THE SECOND       │
│  DEVICE                                                         │
│                              560                                │
└─────────────────────────────────────────────────────────────────┘
```

ENABLING A VIRTUAL OBJECT TO BE ACCESSED BY A FIRST DEVICE, WHEREIN THE FIRST DEVICE IS CONFIGURED FOR PARTICIPATING IN THE VIDEO CONFERENCE WITH A SECOND DEVICE
710

ENABLE THE VIRTUAL OBJECT TO BE INCORPORATED INTO A VIDEO OF THE VIDEO CONFERENCE CAPTURED AT THE FIRST DEVICE, WHEREIN THE VIDEO COMPRISING THE VIRTUAL OBJECT IS CONFIGURED TO BE MANIPULATED AT THE SECOND DEVICE
720

ENABLE TRANSMISSION OF THE VIDEO COMPRISING THE VIRTUAL OBJECT FROM THE FIRST DEVICE TO THE SECOND DEVICE
730

ENABLE CONCURRENT DISPLAY OF THE VIDEO COMPRISING THE VIRTUAL OBJECT AT THE FIRST DEVICE AND THE SECOND DEVICE
740

ENABLE COOPERATIVE MANIPULATION OF THE INCORPORATED VIRTUAL OBJECT AT THE FIRST DEVICE AND THE SECOND DEVICE
750

FIG. 7

AUGMENTING A VIDEO CONFERENCE

CROSS-REFERENCE

This patent application is a continuation of and claims the benefit of co-pending U.S. patent application Ser. No. 13/025,943, filed on Feb. 11, 2011, entitled "AUGMENTING A VIDEO CONFERENCE", by Eric Setton, assigned to the assignee of the present application, which is incorporated herein by reference in its entirety.

BACKGROUND

Participants in a video conference communicate with one another by transmitting audio/video signals to one another. For example, participants are able to interact via two-way video and audio transmissions simultaneously. However, the participants may not be able to completely articulate what they are attempting to communicate to one another based solely on the captured audio captured by microphones and video signals captured by video cameras.

BRIEF DESCRIPTION OF THE DRAWINGS

FIGS. 3 and 7 illustrate embodiments of a method for providing an augmented video conference.

FIGS. 4, 5, 8 and 9 illustrate embodiments of a method for augmenting a video conference.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
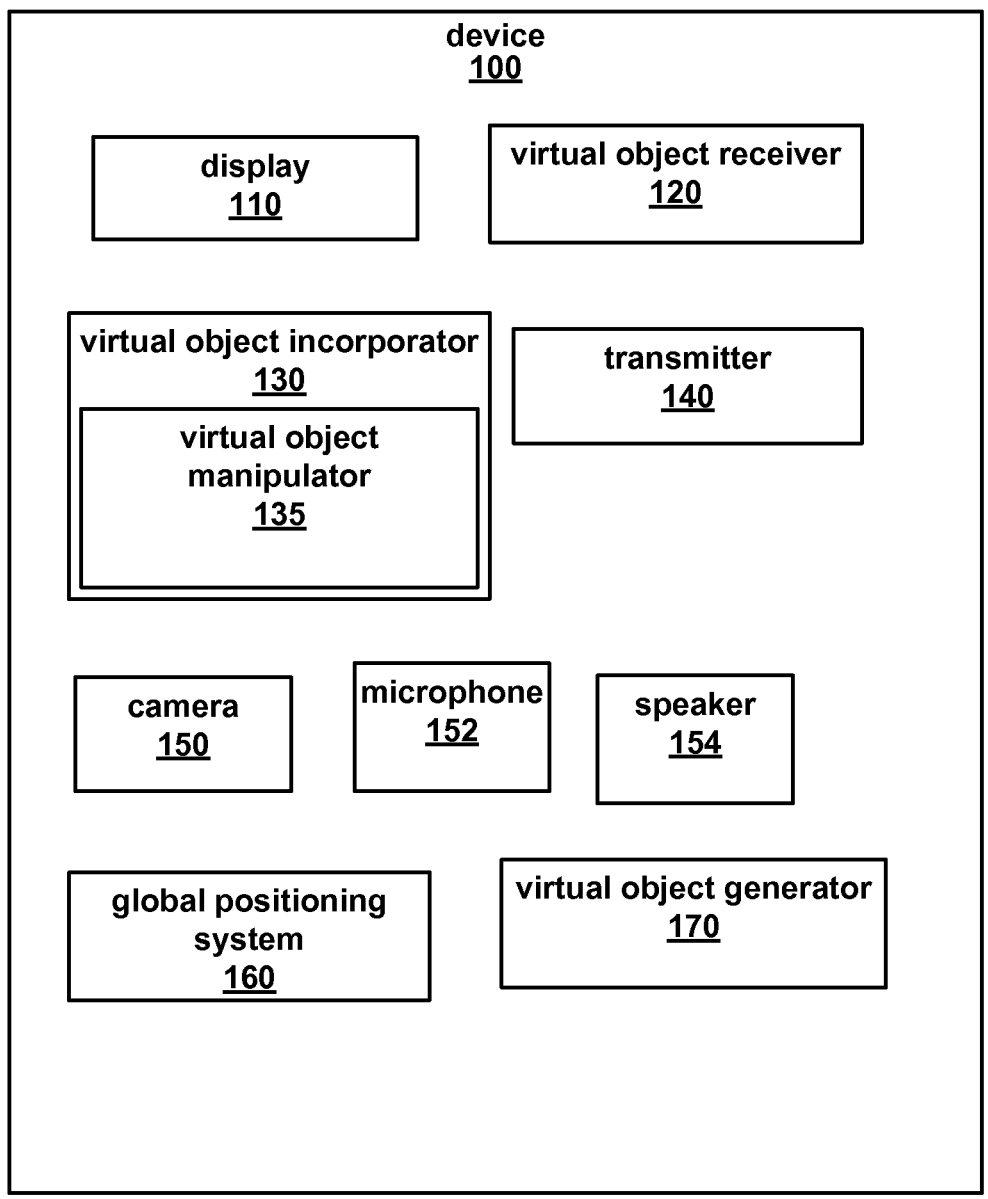
FIGS. 1, 2 and 6 illustrate examples of devices, in accordance with embodiments of the present invention.
Figure 2:
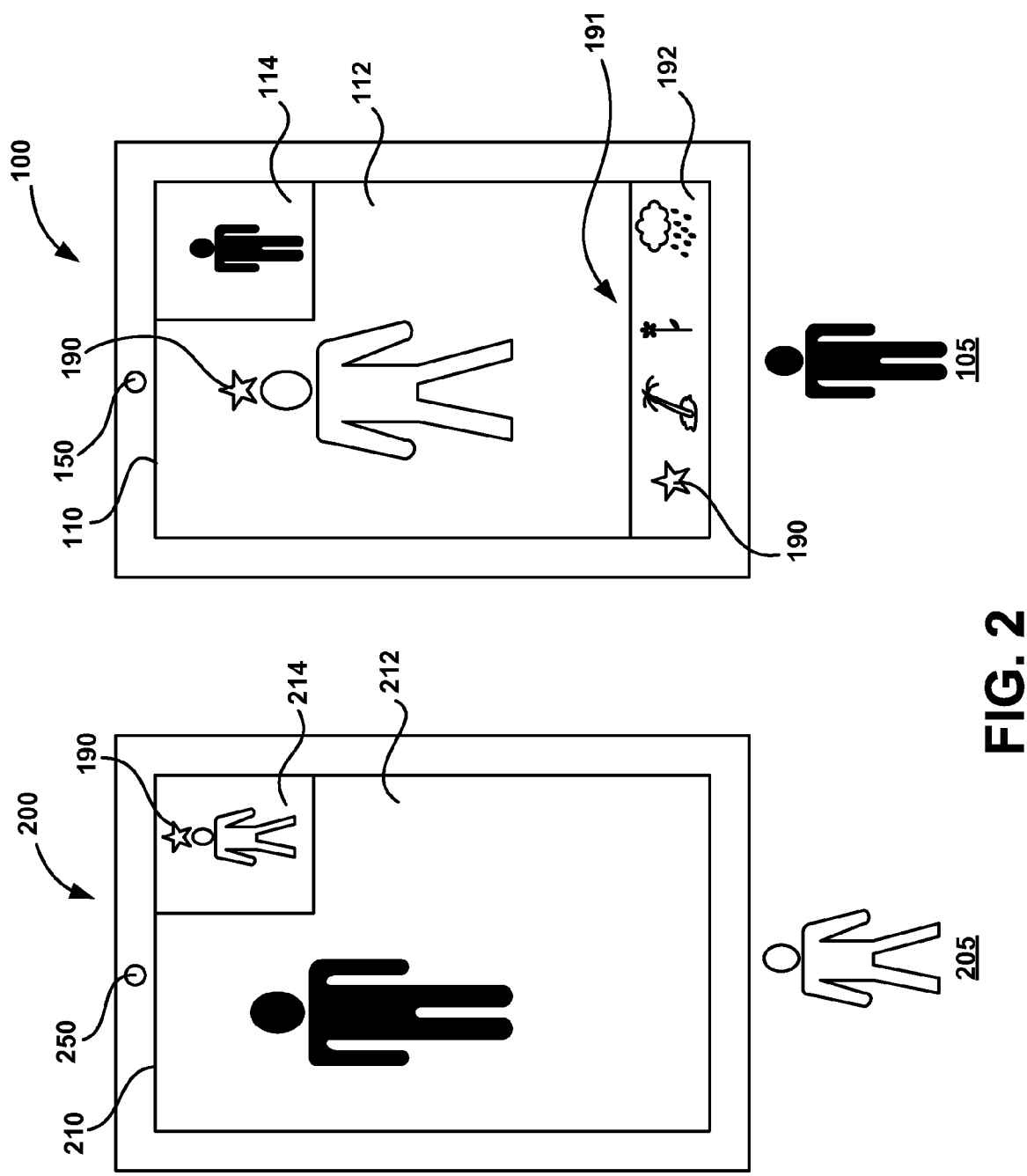

FIG. 1 depicts an embodiment of device 100. Device 100 is configured for participation in a video conference. FIG. 2 depicts devices 100 and 200 participating in a video conference. In general, video conferencing allows two or more locations to interact via two-way video and audio transmissions simultaneously.

The discussion below will first describe the components of device 100. The discussion will then describe the functionality of the components of device 100 during a video conference between devices 100 and 200. Devices 100 and 200 are any communication devices (e.g., laptop, desktop, etc.) capable of participating in a video conference. In various embodiments, device 100 is a hand-held mobile device, such as smart phone, personal digital assistant (PDA), and the like.

Moreover, for clarity and brevity, the discussion will focus on the components and functionality of device 100. However, device 200 operates in a similar fashion as device 100. In one embodiment, device 200 is the same as device 100 and includes the same components as device 100.

Device 100 includes display 110, virtual object receiver 120, virtual object incorporator 130, transmitter 140, camera 150, microphone 152 and speaker 154. Device 100 optionally includes global positioning system 160 and virtual object generator 170.

Display 110 is configured for displaying video captured at device 200. In another embodiment, display 110 is further configured for displaying video captured at device 100.

Virtual object receiver 120 is configured to access a virtual object. A virtual object is configured for augmenting a video conference, which will be described in detail below.

Virtual object incorporator 130 is configured for incorporating the virtual object into the video conference. For example, virtual object incorporator 130 is configured for incorporating the virtual object into a video captured at device 100 and/or device 200.

Transmitter 140 is for transmitting data (e.g., virtual object control code).

Virtual object manipulator 135 is configured to enable manipulation of the virtual object in the video conference.

Camera 150 is for capturing video at device 100. Microphone 152 is for capturing audio at device 100. Speaker 154 is for generating an audible signal at device 100.

Global positioning system 160 is for determining a location of a device 100.

Virtual object generator 170 is for generating a virtual object.

Referring now to FIG. 2, devices 100 and 200 are participating in a video conference with one another. In various embodiments, more than two devices participate in a video conference with each another.

During the video conference, video camera 250 captures video at device 200. For example, video camera 250 captures video of user 205 of device 200.

Video camera 150 captures video at device 100. For example, video camera 150 captures video of user 105. It should be appreciated that video cameras 150 and 250 capture any objects that are within the respective viewing ranges of cameras 150 and 250.

Microphone 152 captures audio signals corresponding to the captured video signal at device 100. Similarly, a microphone of device 200 captures audio signals corresponding to the captured video signal at device 200.

The video captured at device 200 is transmitted to and displayed on display 110 of device 100. For example, a video of user 205 is displayed on a first view 112 of display 110. Moreover, the video of user 205 is displayed on a second view 214 of display 210.

The video captured at device 100 is transmitted to and displayed on display 210 of device 200. For example, a video of user 105 is displayed on first view 212 of display 210. Moreover, the video of user 105 is displayed on a second view 114 of display 110.

In one embodiment, the audio signals captured at devices 100 and 200 are incorporated into the captured video. In another embodiment, the audio signals are transmitted separate from the transmitted video.

As depicted, first view 112 is the primary view displayed on display 110 and second view 114 is the smaller secondary view displayed on display 110. In various embodiments, the size of both first view 112 and second view 114 are adjustable. For example, second view 114 can be enlarged to be the primary view and view 112 can be diminished in size to be a secondary view. Moreover, either one of views 112 and 114 can be closed or fully diminished such that it is not viewable.

Virtual object receiver 120 receives virtual object 190 for augmenting the video conference. Virtual objects can be received from a server or device 200. Virtual objects can be received at different times. For example, virtual objects can be received when an augmenting application is downloaded onto device 100, during login, or in real-time, when the virtual objects are instructed to be incorporated into the video conference.

Figure 6:
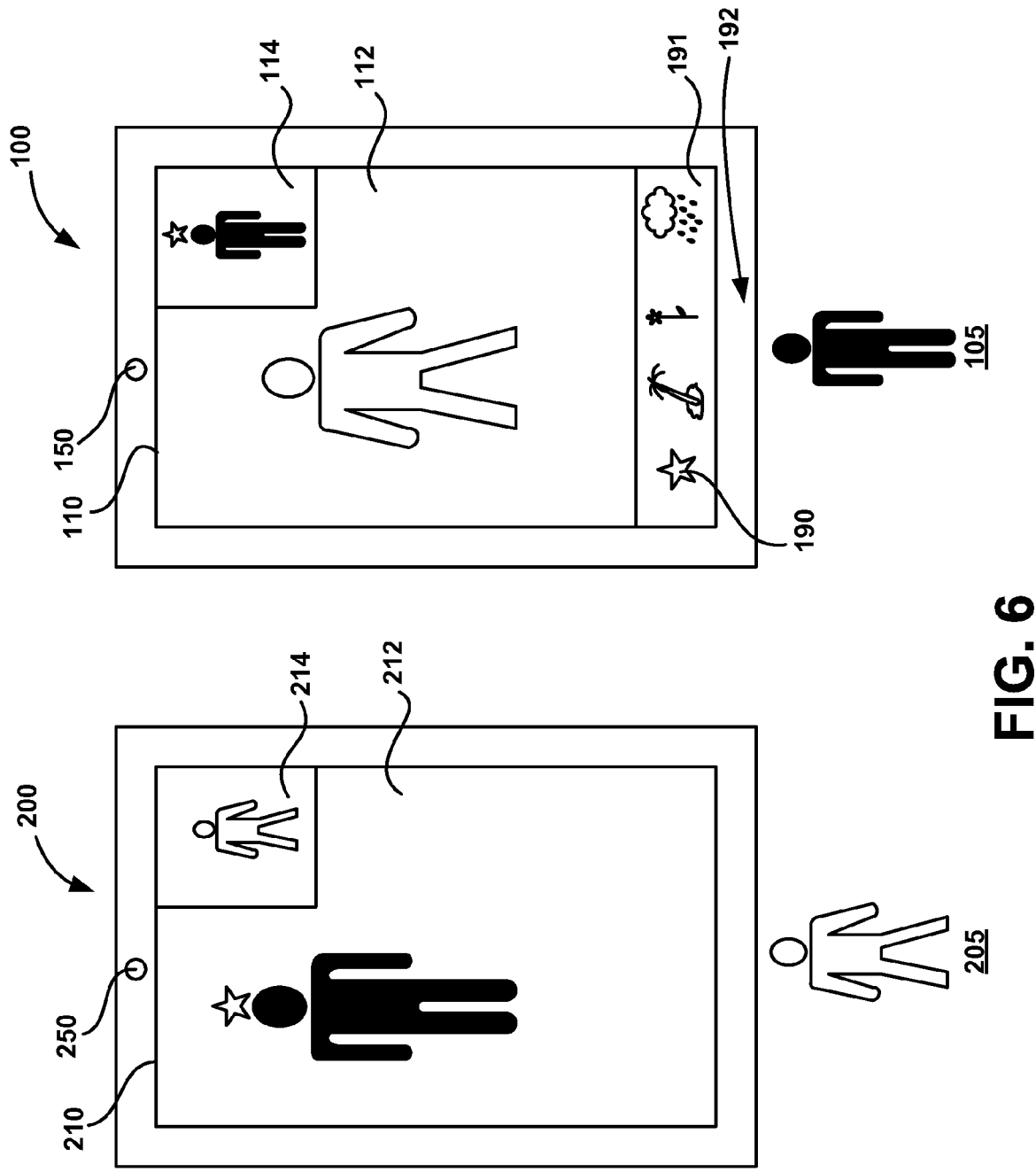

Virtual objects 191 that are depicted in FIGS. 2 and 6 (e.g., star, palm tree, flower, rain cloud) are merely a few of any number of examples of virtual objects. It should be appreciated that a virtual object can be any object that is capable of augmenting a video conference. In other words, a virtual object can be any object that is able to supplement the communication between participants in a video conference. For example, virtual objects can be, but are not limited to, a kiss, heart, emoticon, high-five, background (photo-booth type of effects), color space changes, and/or image process changes (e.g., thinning, fattening).

It should also be appreciated that a virtual object is not limited to a viewable virtual object. For example, a virtual object can be one of a plurality of sounds.

In one embodiment, virtual objects 191 are displayed on display 110 for viewing by user 105. For example, virtual objects 191 are displayed on virtual object bar 192. In one embodiment, virtual object bar 192 is overlayed with first view 112. In another embodiment, virtual object bar 192 is displayed concurrently with first view 112 and/or second view 114.

In various embodiments, virtual object bar 192 is displayed in response to user input, such as, but not limited to key stroke, cursor movement, a detected touch on a touch screen, and designated movement by a user (e.g., expressions, winking, blowing a kiss, hand gesture and the like).

Virtual object incorporator 130 facilitates in incorporating virtual object 190 into the video conference. In one embodiment, at device 100, virtual object incorporator 130 incorporates virtual object 190 into the video captured at device 200. For example, virtual object 190 is incorporated above the head of user 205. Therefore, as depicted, video captured at device 200 is incorporated with object 190 and the augmented video is displayed at least at device 200. Also, the augmented video with incorporated virtual object 190 is displayed at device 100.

In one embodiment, user 105 selects virtual object 190 in virtual object bar 190 and drags virtual object 190 to and places it at a location designated by user 105 (e.g., above the head of user 205, as displayed on first view 112). Once placed at the designated location, virtual object incorporator 130 incorporates virtual object at the designated location.

In another embodiment, virtual object incorporator 130 generates control code. The control code instructs how virtual object 190 is to be incorporated into the video captured at device 200.

For example, control code can be transmitted directly to device 200 to instruct device 200 how virtual object 190 is to be incorporated into video displayed at device 200. In such an example, control code signals or instructs device 200 that virtual object 190 is to be displayed in the video conference. In another example, the control code is sent to a server, device 200 then receives the control code from the server.

FIG. 2 depicts virtual object 190 incorporated into the video conference. However, it should be appreciated that any number of virtual objects can be incorporated into the video conference at any time. For example, five different virtual objects may be concurrently incorporated into the video conference.

It should be appreciated that the term "incorporate" used herein, is used to describe that a virtual object is merely displayed along with some portion of the video conference. As such, the virtual object is merely displayed concurrently with some portion of the video conference. Accordingly, the virtual object is understood to be incorporated into the video and comprises the virtual object. However, it is not understood that the virtual object is integrated with or made part of the video stream.

In one embodiment, the virtual object is superimposed as an overlay on a video. As such, a virtual object is concurrently superimposed as an overlay displayed on devices 100 and 200. For example, a virtual object is concurrently overlayed on video displayed in view 112 and view 214 (as depicted in FIG. 2), and a virtual object can be concurrent overlayed on video displayed in view 114 and view 212 (as depicted in FIG. 6).

In another embodiment, the virtual object is integrated into the bit stream of the video conference.

In another example, a virtual object is concurrently overlayed on video displayed in view 112 and view 212. Also, the virtual object is displayed in a portion of a display independent of the views at the devices and does not require a two-way video to be active (e.g., a one-way video could be active).

It should be noted that the various embodiments described herein can also be used in combination with one another. That is one described embodiment can be used in combination with one or more other described embodiments.

In one embodiment, transmitter 140 then transmits the video captured at device 200, which now includes virtual object 190, to second device 200 such that the video including virtual object 190 is displayed on display 210. In another embodiment, transmitter 140 transmits control code to device 200 (or a server) to instruct device 200 how virtual object 190 is to be incorporated into the video conference.

Virtual object manipulator 135 manipulates incorporated virtual object 190. In one embodiment, virtual object 190 is manipulated at device 100. For example, in response to user input at a touch screen, user 105 rotates virtual object 190 clockwise. Accordingly, video captured at device 200 (and displayed on device 100 and/or device 200) is augmented such that virtual object spins clockwise.

In another embodiment, virtual object 190 is manipulated at device 200. For example, in response to user 205 moving his head from left to right, virtual object 190 is manipulated (via a virtual object manipulator of device 200) such that it moves from left to right with respect to the head movement of user 205. Accordingly, video captured at device 200 (and displayed on device 100 and/or device 200) is augmented such that virtual object 190 is moved from left to right.

In a further embodiment, virtual object 190 is concurrently manipulated at device 100 and device 200. For example, in response to user 205 moving his head from left to right and user 105 spinning virtual object 190 (as described above), virtual object 190 is manipulated such that it concurrently moves from left to right with respect to the head movement of user 205 and spins in response to input from user 105. Accordingly, video captured at device 200 (and displayed on device 100 and/or device 200) is augmented such that virtual object 190 is moved from left to right while spinning clockwise.

In a further embodiment, virtual object 190 is directionally manipulated. For example, user 105 sends a "punch" virtual object (e.g., first, boxing glove) to user 205. Accordingly, user 105 views the "punch" virtual object going into display 110 and user 205 views the "punch" virtual object coming out of display 210.

It should be appreciated that virtual objects are manipulated in response to a variety of inputs. For example, virtual objects can be manipulated via sounds, gestures, expressions, movements, etc. Various examples are: in response to a wink of a user, a virtual object (e.g., a star) comes out of the eye of the user; and in response to a kiss by a user, red lips fly out of the mouth of the user.

In one embodiment, virtual objects 191 are not displayed on display 110 and/or virtual display bar 192 until there is at least one of a variety of inputs, as described above. For example, a virtual object of a heart is not displayed until there is a double-tapping on a touch screen.

Any number of virtual objects can be accessed and/or selected to be incorporated into the video conference. In one embodiment, virtual objects 191 are geographical-related virtual objects. For example, virtual objects 191 are based on a location of devices 100 and/or 200.

In particular, if device 100 is located in Hawaii, then virtual objects 191 are related to that location. For example, geographical-related virtual objects, based on a location in Hawaii determined from GPS 160, could be, but are not limited to, a surfboard, sun, palm tree, coconut, etc.

It should be appreciated that the determination of location can be provided in a variety of ways. For example, the determination of a location of a device can be based on information provided by a user upon registrations, an IP address of the device or any other method that can be used to determine location.

In another embodiment, virtual objects 191 are temporal-related virtual objects based on a time of the video conference. For example, if the video conference occurs on or around Christmas, then virtual objects would be Christmas related (e.g., stocking, Christmas tree, candy cane, etc.). In another example, if the video conference occurs in the evening, then virtual objects would be associated with the evening (e.g., moon, stars, pajamas, etc.)

In a further embodiment, virtual objects 191 are culturally-related virtual objects. For example, if user 105 and/or user 205 are located in Canada, then virtual objects 191 could be, but are not limited to, a Canadian flag, hockey puck, curling stone, etc.

In another embodiment, virtual objects 191 are user-created virtual objects. For example, users 105 and/or 205 manually create the virtual objects then virtual object generator 170 utilizes the creation to generate user-created virtual objects.

In yet another embodiment, virtual objects 191 are available and/or accessed based on account status. For example, user 105 has a payable account to have access to virtual objects 191. If user 105 has provided adequate payment to the account, then user 105 is able to access virtual objects 191. In contrast, if user has not provided adequate payment to the account, then user 105 is unable to access virtual objects 191.

Figure 4:
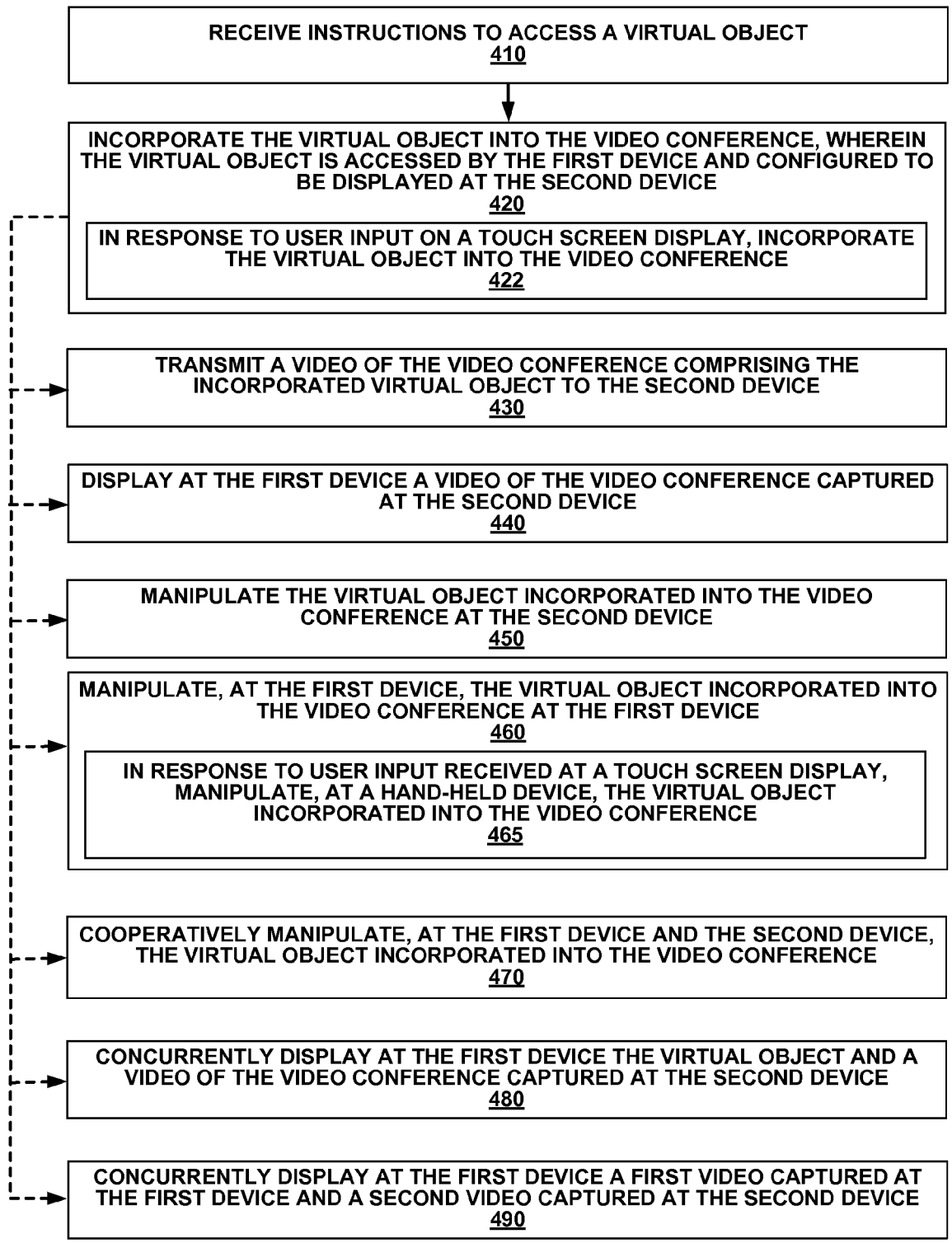

FIGS. 3-5 depict embodiments of methods 300-500, respectively. In various embodiments, methods 300-500 are carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, methods 300-500 are performed by device 100 and/or device 200, as described in FIGS. 1 and 2.

Now referring to FIG. 3, at 310 of method 300, a virtual object is enabled to be accessed by a first device, wherein the first device is configured for participating in the video conference with a second device. For example, virtual object 190 is enabled to be accessed by device 100, wherein device 100 is configured for participating in a video conference with at least device 200.

At 320, the virtual object is enabled to be incorporated into a video of the video conference captured at the second device, wherein the video comprising the virtual object is configured to be displayed at the second device. For example, virtual object 190 is enabled to be incorporated into the video captured of user 205 at device 200 and also displayed at device 200.

At 330, the video comprising the virtual object is enabled to be transmitted from the first device to the second device. For example, transmission of the video comprising any one of virtual objects 191 is enabled to be transmitted by transmitter 140 to device 200.

At 340, concurrent display of the video comprising the virtual object is enabled at the first device and the second device. For example, the video comprising object 190 is enabled to be simultaneously displayed at devices 100 and 200.

At 350, cooperative manipulation of the incorporated virtual object at the first device and the second device is enabled. For example, user 205 interacts with virtual object 190 in second view 214 and user 105 also cooperatively interacts with virtual object in first view 112.

Now referring to FIG. 4, at 410 of method 400, instructions are received to access a virtual object. For example, in response to user input (e.g., key stroke, cursor movement, a detected touch on a touch screen, etc.), instructions are received to access virtual object 190. In various embodiments, the virtual object(s) can be, but is not limited to, a geographical-related virtual object, a temporal-related virtual object, a culturally-related virtual object, and/or a user-created virtual object.

At 420, the virtual object is incorporated into the video conference, wherein the virtual object is accessed by the first device and configured to be displayed at the second device. For example, virtual object 190 is accessed at device 100 and incorporated, at device 100, into the video captured at device 200. The video comprising incorporated virtual object 190 is configured to be displayed at device 200.

In another example, user 105 is able to place a virtual object of lips (to signify a kiss) on the cheek of user 205 by designating a location of the lips on the cheek of user 105 in first view 112. Accordingly, the virtual object of lips is incorporated into the video captured at device 200 and displayed on device 100 and 200. The virtual object of lips can be incorporated for the duration of the video conference or can be incorporated for a designated time duration.

In one embodiment, at 422, in response to user input on a touch screen display, the virtual object is incorporated into the video conference. For example, in response to user input on a touch screen display of device 100, the virtual object is incorporated into the video conference.

At 430, a video of the video conference comprising the incorporated virtual object is transmitted to the second device. For example, video that includes the virtual object is transmitted to the device 200 via transmitter 140.

At 440, a video of the video conference captured at the second device is displayed at the first device. For example, video of user 205 at device 200 is captured at device 200 and displayed at device 100.

At 450, the virtual object incorporated into the video conference is manipulated at the second device. For example, user 205 interacts with virtual object 190 displayed in second view 214 by rotating virtual object 190.

At 460, the virtual object incorporated into the video conference is manipulated at the first device. For example, user 105 interacts with virtual object 190 displayed in first view 112 by reducing the size of virtual object 190.

In one embodiment, at 465, in response to user input received at a touch screen display of a hand-held device, the virtual object incorporated into the video conference is manipulated. For example, device 100 is a hand-held device (e.g., cell phone) with a touch screen display. Accordingly, in response to user 105 touching the touch screen display, the size of virtual object 190 is reduced.

At 470, the virtual object incorporated into the video conference cooperatively manipulated at the first device and the second device. For example, user 205 moves his head from left to right such that virtual object 190 tracks with the head movement. Also, user 105 cooperatively rotates virtual object 190 while virtual object 190 is tracking with the head movement of user 205.

At 480, a video of the video conference captured at the second device and the virtual object are concurrently displayed at the first device. For example, video captured at second device 200 including incorporated virtual object 190 are concurrently displayed on first view 112.

At 490, a first video captured at the first device and a second video captured at the second device are concurrently displayed at the first device. For example, video captured at device 200 is displayed on first view 112 and video captured at device 100 is concurrently displayed on second view 114.

Now referring to FIG. 5, at 510 of method 500, video captured at a second device is displayed on a first device.

At 515, a virtual object is received at the first device, wherein the virtual object is configured to augment the video conference. In various embodiments, the virtual object(s) can be, but is not limited to, a geographical-related virtual object, a temporal-related virtual object, a culturally-related virtual object, and/or a user-created virtual object.

At 520, the virtual object is incorporated into the video captured at the second device. For example, virtual object 190 is incorporated into the video captured at device 200, such that virtual object 190 is placed above the head of user 205 and tracks with movements of the head of user 205.

In one embodiment, at 522, in response to user input at a touch screen display, the virtual object is incorporated into the video captured at the second device. For example, in response to input of user 105 at a touch screen display of device 100, any number of virtual objects are incorporated into the video captured at the device 200.

At 530, the video comprising the virtual object is enabled to be displayed at the second device. At 535, the video comprising the virtual object is transmitted to the second device.

At 540, the virtual object incorporated into the video captured at the second device is manipulated at the second device. For example, user 205 changes the color of virtual device 190, displayed in second view 214, to red.

At 545, the virtual object incorporated into the video captured at the second device is manipulated at the first device. For example, user 105 changes the location virtual device 190 from the top of the head of user 205 to the left hand of user 205.

In one embodiment, at 547, in response to user input received at a touch screen display of a hand-held mobile device, the virtual object incorporated into the video captured at the second device is manipulated. For example, in response to user input at a touch screen display of device 100, user 105 changes virtual device 190 from a star (as depicted) to a light bulb (not shown).

At 550, the virtual object incorporated into the video captured at the second device cooperatively manipulated at the first device and the second device. For example, user 205 manipulates virtual object 190 in second view 214 and user 105 cooperatively manipulates virtual object in first view 112.

At 555, the virtual object and the video captured at the second device is concurrently display at the first device. At 560, a video captured at the first device and the video captured at the second device are concurrently displayed at the first device.

FIG. 6 depicts an embodiment of devices 100 and 200 participating in a video conference with one another. Devices 100 and 200 operate in a similar fashion, as described above.

During the video conference, video camera 150 captures video at device 100. For example, video camera 150 captures video of user 105 of device 100.

Video camera 250 captures video at device 200. For example, video camera 250 captures video of user 205, who is the user of device 200.

The video captured at device 100 is displayed on display 110 of device 100. For example, a video of user 105 is displayed on a second view 114 displayed on display 110. Moreover, the video of user 205 is displayed on first view 112 on display 110.

Virtual object receiver 120 receives virtual object 190 for augmenting the video conference between for users 105 and 205 participating in the video conference.

Virtual objects 191 are displayed on display 110 for viewing by user 105. For example, virtual objects 191 are displayed on virtual object bar 192. In one embodiment, virtual object bar 192 is overlayed with first view 112. In another embodiment, virtual object bar 192 is displayed concurrently with first view 112 and/or second view 114.

Virtual object incorporator 130 incorporates virtual object 190 into the video conference. In particular, at device 100, virtual object 190 is incorporated into the video captured at device 100. For example, virtual object 190 is incorporated above the head of user 105. Therefore, as depicted, video captured at device 100 is incorporated with object 190 and the augmented video is displayed at least at device 200. Also, the augmented video with incorporated virtual object 190 is concurrently displayed at device 100.

In one embodiment, user 105 selects virtual object 190 in virtual object bar 190 and drags virtual object 190 to and places it at a location designated by user 105 (e.g., above the head of user 105, as depicted). Once placed at the designated location, virtual object incorporator 130 incorporates virtual object at the designated location.

Transmitter 140 then transmits the video captured at device 100, which now includes virtual object 190, to second device 200 such that the video including virtual object 190 is displayed on display 210.

A virtual object manipulator of device 200 manipulates incorporated virtual object 190. For example, in response to user input of user 205 at a touch screen, user 205 rotates virtual object 190 clockwise. Accordingly, video captured at device 100 (and displayed on device 200 and/or device 100) is augmented such that virtual object spins clockwise.

In another embodiment, virtual object 190 is manipulated at device 100. For example, in response to user 105 moving his head from left to right, virtual object 190 is manipulated (via virtual object manipulator 135) such that it moves from left to right with respect to the head movement of user 105. Accordingly, video captured at device 100 (and displayed on device 100 and/or device 200) is augmented such that virtual object 190 is moved from left to right.

In a further embodiment, virtual object 190 is concurrently manipulated at device 100 and device 200. For example, in response to user 105 moving his head from left to right and user 205 spinning virtual object 190, virtual object 190 is manipulated such that it concurrently moves from left to right with respect to the head movement of user 105 and spins in response to input from user 205. Accordingly, video captured at device 100 (and displayed on device 100 and/or device 200) is augmented such that virtual object 190 is moved from left to right while spinning clockwise.

Figure 8:
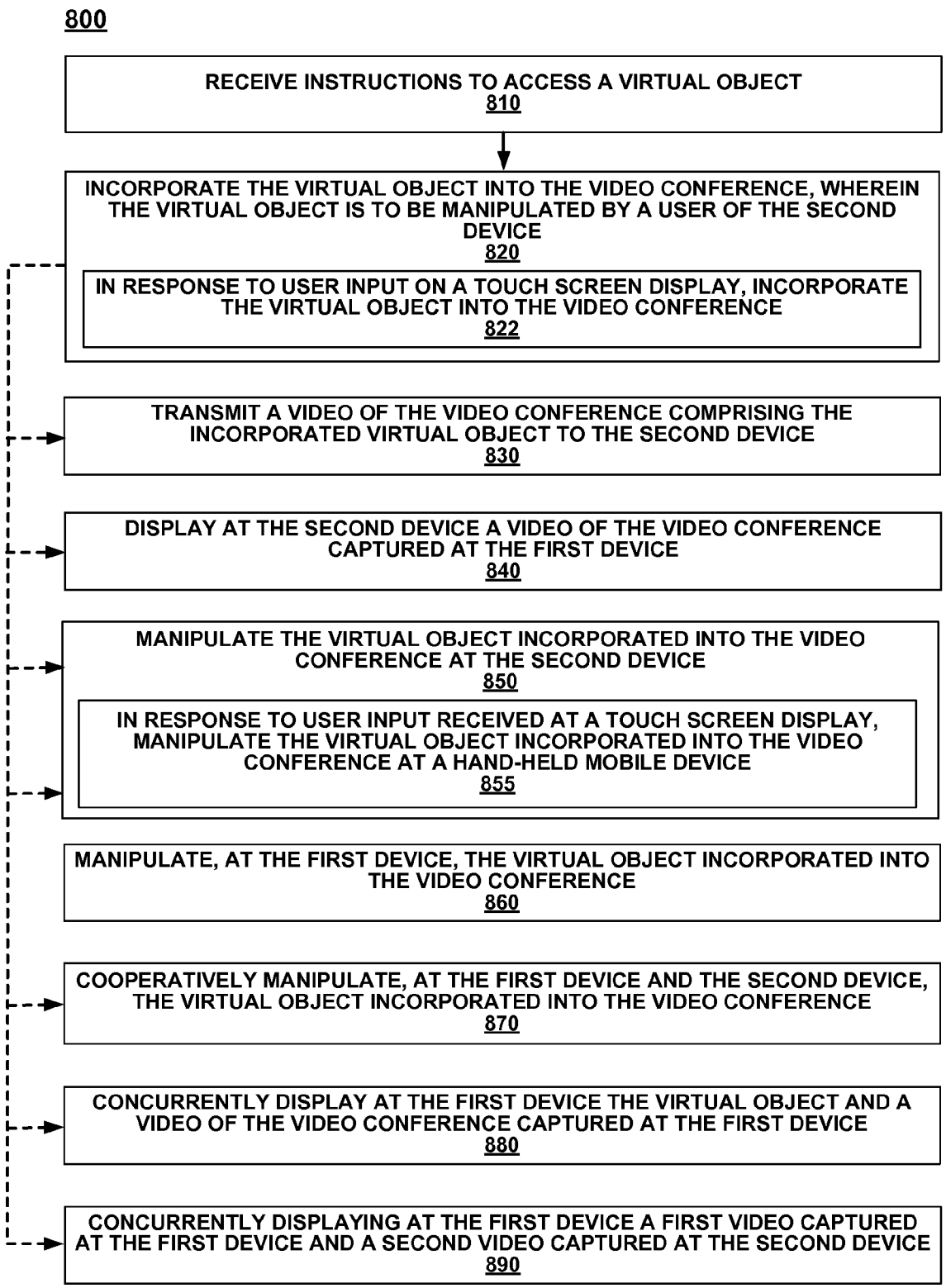
Figure 9:
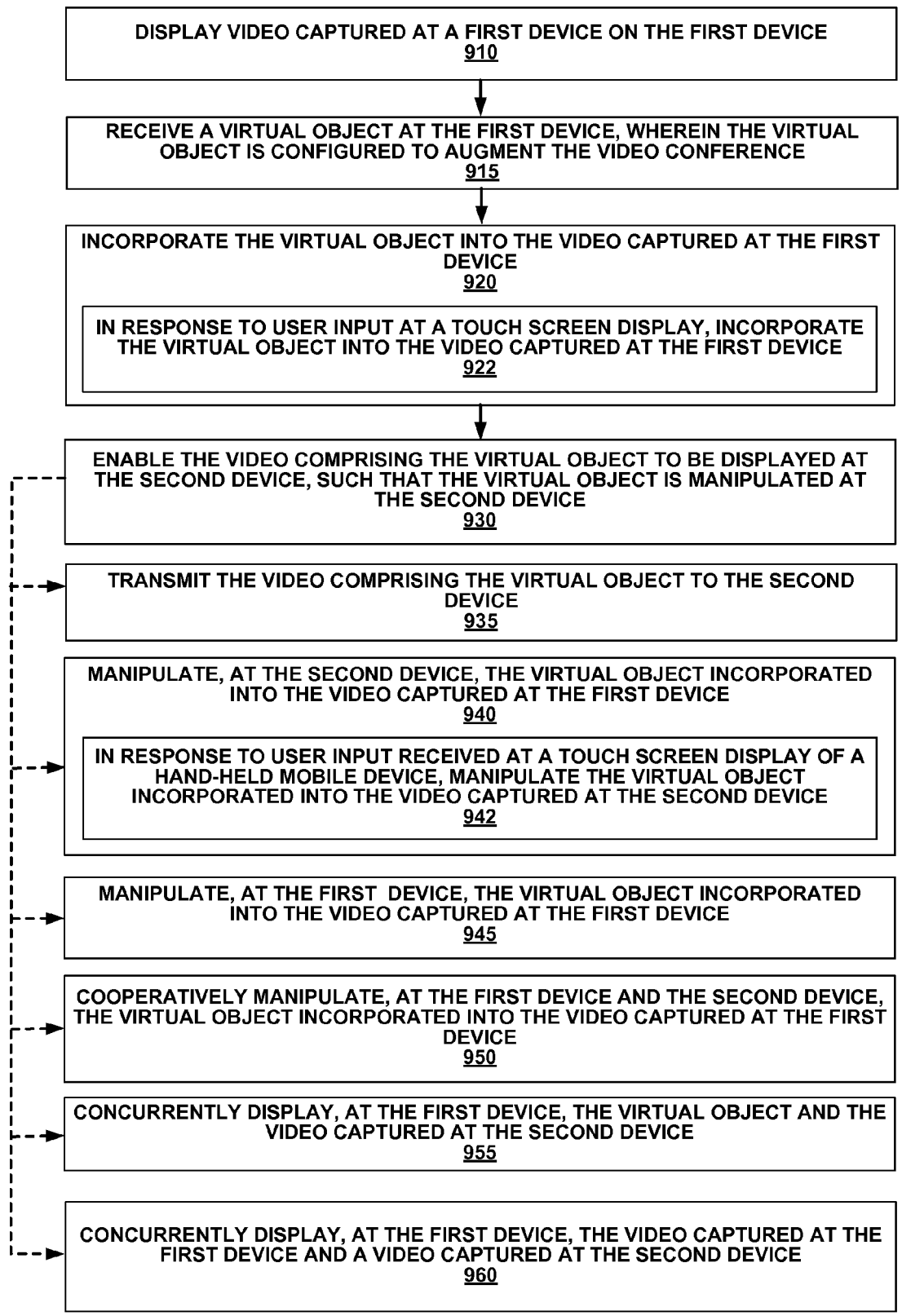

FIGS. 7-9 depict embodiments of methods 700-900, respectively. In various embodiments, methods 700-900 are carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, methods 700-900 are performed by device 100 and/or device 200, as described in FIGS. 1 and 6.

Now referring to FIG. 7, at 710 of method 300, a virtual object is enabled to be accessed by a first device, wherein the first device is configured for participating in the video conference with a second device. For example, virtual object 190 is enabled to be accessed by device 100, wherein device 100 is configured for participating in a video conference with at least device 200.

At 720, the virtual object is enabled to be incorporated into a video of the video conference captured at the first device, wherein the video comprising the virtual object is configured to be displayed at the second device. For example, virtual object 190 is enabled to be incorporated into the video captured at device 100 of user 105 and displayed at the device 100 and 200.

At 730, the video comprising the virtual object is enabled to be transmitted from the first device to the second device. For example, transmission of the video comprising any one of virtual objects 191 is enabled to be transmitted by transmitter 140 to device 200.

At 740, concurrent display of the video comprising said virtual object is enabled at the first device and the second device. For example, the video comprising object 190 is enabled to be simultaneously displayed at devices 100 and 200.

At 750, cooperative manipulation of the incorporated virtual object at the first device and the second device is enabled. For example, user 205 interacts with virtual object 190 in first view 212 and user 105 also cooperatively (or simultaneously) interacts with virtual object in second view 114.

Now referring to FIG. 8, at 810 of method 800, instructions are received to access a virtual object. For example, in response to user input at a touch screen display, instructions are received to access virtual object 190.

At 820, the virtual object is incorporated into the video conference, wherein the virtual object is to be manipulated by a user of the second device. For example, virtual object 190 is accessed at device 100 and incorporated, at device 100, into the video captured at device 100. The video comprising incorporated virtual object 190 is configured to be displayed and manipulated at device 200. In one embodiment, at 822, in response to user input on a touch screen display, the virtual object is incorporated into the video conference.

At 830, a video of the video conference comprising the incorporated virtual object is transmitted to the second device.

At 840, the video conference captured at the first device is displayed at the second device. For example, video of user 105 at device 100 is captured at device 100 and displayed at device 200.

At 850, the virtual object incorporated into the video conference is manipulated at the second device. For example, user 205 interacts with virtual object 190 displayed in first view 212 by rotating virtual object 190.

In one embodiment, at 855, in response to user input received at a touch screen display, the virtual object incorporated into the video conference is manipulated at a hand-held mobile device. For example, device 200 is a hand-held device (e.g., cell phone) with a touch screen display. Accordingly, in response to user 205 touching the touch screen display, the size of virtual object 190 is reduced.

At 860, the virtual object incorporated into the video conference is manipulated at the first device. For example, user 105 interacts with virtual object 190 displayed in second view 114 by reducing the size of virtual object 190.

At 870, the virtual object incorporated into the video conference is cooperatively manipulated at the first device and the second device. For example, user 105 moves his head from left to right such that virtual object 190 tracks with the head movement. Also, user 205 cooperatively rotates virtual object 190 while virtual object 190 is tracking with the head movement of user 105.

At 880, a video of the video conference captured at the second device and the virtual object are concurrently displayed at the first device. For example, video captured at second device 200 is displayed on first view 112 and video captured at device 100 including incorporated virtual object 190 are concurrently displayed on second view 114.

At 890, a first video captured at the first device and a second video captured at the second device are concurrently display at the first device.

Now referring to FIG. 9, at 910 of method 900, video captured at a first device is displayed on the first device.

At 915, a virtual object is received at the first device, wherein the virtual object is configured to augment the video conference. In various embodiments, the virtual object(s) can be, but is not limited to, a geographical-related virtual object, a temporal-related virtual object, a culturally-related virtual object, and/or a user-created virtual object.

At 920, the virtual object is incorporated into the video captured at the first device. For example, virtual object 190 is incorporated into the video captured at device 100, such that virtual object 190 is placed above the head of user 105 and tracks with movements of the head of user 105.

In one embodiment, at 922, in response to user input at a touch screen display, the virtual object is incorporated into the video captured at the device. For example, in response to input of user 105 at a touch screen display of device 100, any number of virtual objects are incorporated into the video captured at device 100.

At 930, the video comprising the virtual object is enabled to be displayed at the second device, such that the virtual object is manipulated at the second device. At 935, the video comprising the virtual object is transmitted to the second device.

At 940, the virtual object incorporated into the video captured at the first device is manipulated at the second device.

For example, user 205 changes the color of virtual device 190, displayed in first view 212, to red.

In one embodiment, at 942, in response to user input received at a touch screen display of a hand-held mobile device, the virtual object incorporated into the video captured at the first device is manipulated. For example, in response to user input at a touch screen display of device 200, user 205 changes virtual device 190 from a star (as depicted) to a light bulb (not shown).

At 945, the virtual object incorporated into the video captured at the first device is manipulated at the first device. For example, user 105 changes the location virtual device 190 from the top of the head of user 105 to the left hand of user 105.

At 950, the virtual object incorporated into the video captured at the first device cooperatively manipulated at the first device and the second device. For example, user 205 manipulates virtual object 190 in first view 212 and user 105 cooperatively manipulates virtual object in second view 114.

At 955, the virtual object and the video captured at the first device are concurrently display at the first device. At 560, a video captured at the first device and the video captured at the second device are concurrently displayed at the first device.

Various embodiments of the present invention are thus described. While the present invention has been described in particular embodiments, it should be appreciated that the present invention should not be construed as limited by such embodiments, but rather construed according to the following claims.

I claim:

1. A non-transitory computer readable storage medium having computer-executable instructions stored thereon for causing a computer system to perform a method of augmenting a video conference between a first device and a second device, said method comprising:
   receiving instructions to access a virtual object, wherein said virtual object comprises an object that is capable of augmenting said video conference, wherein said augmenting comprises supplementing a communication between participants in said video conference, wherein said virtual object comprises at least one of a viewable object and at least one sound, wherein said viewable object is viewable on a display screen on at least one of said first device and said second device and is a discrete entity that can be manipulated independently of other such entities wherein said receiving instructions comprises:
      receiving at least one of control code and a selection of said virtual object via virtual object bar, wherein said virtual object bar is enabled to be displayed at said first device at least during said video conference and comprises selectable virtual objects thereon; and
      incorporating said virtual object into said video conference, wherein said virtual object is accessed by said first device and configured to be displayed at said second device.

2. The non-transitory computer readable storage medium of claim 1, wherein said incorporating said virtual object into said video conference comprises:
   in response to user input on a touch screen display, incorporating said virtual object into said video conference.

3. The non-transitory computer readable storage medium of claim 1, further comprising:
   transmitting a video of said video conference comprising said incorporated virtual object to said second device.

4. The non-transitory computer readable storage medium of claim 1, further comprising:
   displaying at said first device a video of said video conference captured at said second device.

5. The non-transitory computer readable storage medium of claim 1, further comprising:
   manipulating, at said second device, said virtual object incorporated into said video conference.

6. The non-transitory computer readable storage medium of claim 1, further comprising:
   manipulating, at said first device, said virtual object incorporated into said video conference at said first device.

7. The non-transitory computer readable storage medium of claim 6, wherein said manipulating, at said first device, said virtual object incorporated into said video conference at said first device comprises:
   in response to user input received at a touch screen display, manipulating, at a hand-held device, said virtual object incorporated into said video conference.

8. The non-transitory computer readable storage medium of claim 1, further comprising:
   cooperatively manipulating, at said first device and said second device, said virtual object incorporated into said video conference.

9. The non-transitory computer readable storage medium of claim 1, further comprising:
   concurrently displaying at said first device said virtual object and a video of said video conference captured at said second device.

10. The non-transitory computer readable storage medium of claim 1, further comprising:
    concurrently displaying at said first device a first video captured at said first device and a second video captured at said second device.

11. The non-transitory computer readable storage medium of claim 1, wherein said receiving instructions to access a virtual object comprises:
    receiving instructions to access a geographical-related virtual object based on a location of said first device, wherein content of said geographical-related virtual object is related to said location of said first device.

12. The non-transitory computer readable storage medium of claim 1, wherein said receiving instructions to access a virtual object comprises:
    receiving instructions to access a temporal-related virtual object based on a time of said video conference, wherein content of said temporal-related virtual object is related to said time that said video conference is taking place.

13. The non-transitory computer readable storage medium of claim 1, wherein said receiving instructions to access a virtual object comprises:
    receiving instructions to access a culturally-related virtual object, wherein content of said culturally-related virtual object is related to a culture of a location of said first device.

14. The non-transitory computer readable storage medium of claim 1, wherein said receiving instructions to access a virtual object comprises:
    receiving instructions to access a user-created virtual object.

15. A device configured for participation in a video conference, said device comprising:
    a display disposed on said device for displaying video captured at a second device;
    a virtual object receiver for receiving a virtual object, wherein said virtual object is configured to augment said video conference, wherein said virtual object comprises an object that is capable of augmenting said video conference, wherein said augmenting comprises supplementing a communication between participants in said video conference, wherein said virtual object comprises at least one of a viewable object and at least one sound, wherein said viewable object is viewable on a display screen on at least one of said first device and said second device and is a discrete entity that can be manipulated independently of other such entities, and wherein said virtual object receiver receives at least one of control code and a selection of a set of selectable virtual objects presented in a virtual object bar, wherein said virtual object bar is enabled to be displayed at said first device at least during said video conference and comprises selectable virtual objects thereon;

a virtual object incorporator for incorporating said virtual object into said video captured at said second device, wherein said virtual object is accessed by said first device.

16. The device of claim 15, wherein said display comprises:
a touch screen display.

17. The device of claim 15, further comprising:
a global positioning system.

18. The device of claim 15, further comprising:
a virtual object generator configured for generating said virtual object.

19. The device of claim 15, wherein said device is a handheld mobile device.

20. The device of claim 15, further comprising:
a video camera.

* * * * *